US008464002B2

(12) United States Patent
Burger et al.

(10) Patent No.: US 8,464,002 B2
(45) Date of Patent: Jun. 11, 2013

(54) BURST-BASED CACHE DEAD BLOCK PREDICTION

(75) Inventors: Doug Burger, Redmond, WA (US); Haiming Liu, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 531 days.

(21) Appl. No.: 12/579,183

(22) Filed: Oct. 14, 2009

(65) Prior Publication Data

US 2011/0087845 A1 Apr. 14, 2011

(51) Int. Cl.
*G06F 12/08* (2006.01)

(52) U.S. Cl.
USPC .... 711/133; 711/136; 711/167; 711/E12.001; 711/E12.022

(58) Field of Classification Search
None
See application file for complete search history.

(56) References Cited

U.S. PATENT DOCUMENTS

| | | | | |
|---|---|---|---|---|
| 5,895,487 | A * | 4/1999 | Boyd et al. | 711/122 |
| 6,470,428 | B1 | 10/2002 | Milway et al. | |
| 2008/0052465 | A1* | 2/2008 | Lo | 711/120 |
| 2008/0082754 | A1* | 4/2008 | Bell et al. | 711/136 |
| 2009/0216952 | A1* | 8/2009 | Sonnelitter et al. | 711/125 |

OTHER PUBLICATIONS

Liu, Haiming, et al. "Cache Bursts: A New Approach for Eliminating Dead Blocks and Increasing Cache Efficiency," Nov. 8-12, 2008, 41st Annual IEEE/ACM International Symposium on Microarchitecture, pp. 222-233.*
Liu, Haiming, "Hardware Techniquest to Improve Cache Efficiency," May 2009, pp. 16-76.*
Tyson, Gary et al. "A Modified Approach to Data Cache Management". IEEE Xplore, pp. 93-103, 1995.
Lin, Wei-fen et al. "Reducing DRAM Latencies with an Integrated memory Hierarchy Design". 7th International Symposium on High-Performance Computer Architecture, Jan. 2001.
Qureshi, Moinuddin K. et al. "Adaptive Insertion Policies for High Performance Caching". ISCA '07, Jun. 9-13, 2007, San Diego, California, USA.
Lai, An-Chow et al. "Dead-Block Prediction & Dead-Block Correlating Prefetchers". IEEE, pp. 144-154, 2001.
Lebeck, Alvin R. et al. "Dynamic Self-Invalidation: Reducing Coherence Overhead in Shared-Memory Multiprocessors". ISCA '95, Santa Margherita Ligure, Italy, 1995.
Johnson, Teresa L. et al. "Run-Time Cache Bypassing". IEEE Transactions on Computers, vol. 48, No. 12, pp. 1338-1354, Dec. 1999.

(Continued)

*Primary Examiner* — Michael Krofcheck
(74) *Attorney, Agent, or Firm* — Dorsey & Whitney LLP

(57) ABSTRACT

The present disclosure generally relates to cache memory systems and/or techniques to identify dead cache blocks in cache memory systems. Example systems may include a cache memory that is accessible by a cache client. The cache memory may include a plurality of storage locations for a first cache block, with a most recently used position location in the cache memory. A cache controller may be configured to predict whether the first cache block stored in the cache memory is identified as a dead cache block based on a cache burst of the first cache block. The cache burst may comprise a first access of the first cache block by a cache client and any subsequent contiguous accesses of the first cache block following the first access by the cache client while the first cache block is in a most recently used position of the cache set.

20 Claims, 12 Drawing Sheets

OTHER PUBLICATIONS

Kharbutli, Mazen et al. "Counter-Based Cache Replacement and Bypassing Algorithms". IEEE Transactions on Computers, vol. 57, No. 4, pp. 433-447, Apr. 2008.

"International Search Report and Written Opinion for PCT application No. PCT/US2010/038406", Jan. 20, 2012, 8.

Lai, An-Chow et al., "Selective, Accurate, and Timely Self-Invalidation Using Last-Touch Prediction", Proceedings of the 27th Annual International Symposium on Computer Architecture (ISCA), Jun. 2000.

* cited by examiner

BURST-BASED CACHE DEAD BLOCK PREDICTION

STATEMENT REGARDING GOVERNMENT SPONSORED RESEARCH

This invention as was made with government support under F33615-03-C-4106 awarded by the Air Force. The government has certain rights in the invention.

BACKGROUND

Data caches in general-purpose microprocessors typically contain "dead" blocks that may be identified, marked for eviction, and subsequently evicted. Traditionally, a cache line that will be referenced again before eviction from the cache is called a "live" block; otherwise, it is called a "dead" block. Cache efficiency may be improved if "dead" blocks are accurately identified and evicted early, since inaccurate and/or late predictions may increase the cache-miss rate and have an adverse impact on system performance. Existing methods of dead block prediction predict the death of a cache block immediately after it is accessed, and can lack both accuracy and efficiency.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
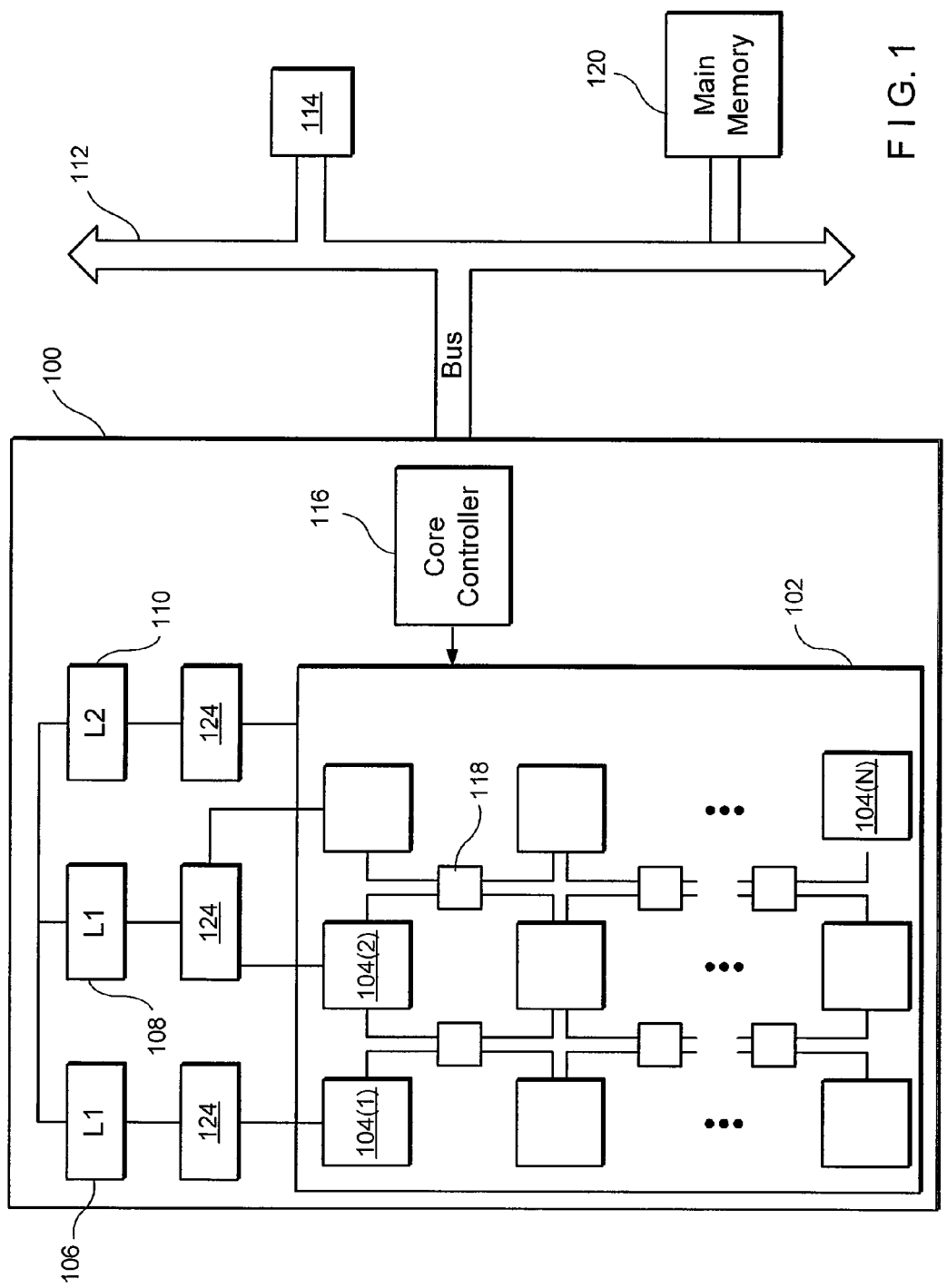
FIG. 1 is a schematic of an illustrative example of a multinodal processor network, arranged in accordance with the present disclosure.

The figures include numbering to designate illustrated components of the examples shown within the drawings, including the following: multinodal processor arrangement 100; node array 102; processing nodes 104(1) to 104(N); resource 106 dedicated to a single processing node; shared resource 108 dedicated to any subset of the processing nodes; external bus 112; external component 114; main memory 120; dead block predictor 216; predictor table 218; history table 220; cache controller 124; cache 200, cache set 201, block A 202, cache set 203, block B 204, block D 208 block 206, block B 204, block E 210, block F 212, block G 214; state bit field 230; accesses 312, 317, 322, 327, 332, 337, 342, 347; operations 401, 403, 405, 407, 409, 410, 411, 413, 415 418, 419, 421, 423, 425, 427, 429; operations 505, 507, 509, 511, 525, 527; operations 601, 603, 605, 606, 607, 609, 611, 613; operations 701, 703, 705, 707, 711, 715, 713, 714; operations 801, 803, 805, 807, 809, 811, 813, 815, 817, 818; operations 902, 904, 906, 908, 910; computer program product 1005, signal bearing medium 1010, computer executable instructions 1015, computer readable medium 1020, computer recordable medium 1025, communication medium 1030, computing device 1100; system memory 1120; operating system 1122; program data 1124; removable storage 1151; non-removable storage 1152; bus/interface controller 1140; storage interface bus 1141; memory controller 1115; memory bus 1130; interface bus 1142; graphics processing unit 1161 A/V ports 1163; audio processing unit 1162; output devices 1160; peripheral interfaces 1170; serial interface controller 1171; I/O ports 1173; parallel interface controller 1172; communication devices 1180; network controller 1181; communication ports 1182; and other computing devices 1190.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein. Additionally, some well-known structures, circuits, techniques, and the like have not been described in detail, to avoid unnecessarily obscuring the disclosure.

In a data cache, cache efficiency may be adversely impacted by dead blocks residing in the cache, since these blocks will often reside in the cache for a long period of time with no accesses before being evicted. With "least recently used ("LRU") replacement techniques, a dead cache block is not evicted from the cache until it is pushed to the LRU position of the stack, thereby requiring multiple replacements to the cache before the dead block may be evicted. To achieve better efficiency, the identification of a dead block may be done between the last access to the block and its eviction from the cache. However, since the processing hardware typically does not know with certainty which access to a block will be the last access, the identification of a block as dead tends to be speculative.

Most existing dead block predictors predict the death of a block immediately after it is accessed, and based on each individual access of the block. While these approaches identify dead blocks as early as possible, they may sacrifice prediction accuracy because a block just accessed may be accessed again soon. As such, caches managed by existing dead block predictors may experience lags due to cache misses, in which the processor references a prematurely evicted block that must subsequently be imported into the cache.

A better approach would be to predict dead blocks using the cache burst history of a block. A cache burst begins when a block moves into the most recently used ("MRU") position and ends on the last reference to the block, before it moves out of the MRU position. As such, a dead block prediction may be made when the block becomes non-MRU, and using the block's cache burst history. Because the cache burst history hides the irregularity in individual references, it may be more accurate than individual reference histories. Examples of burst-based dead block prediction techniques, as well as other configurations, will be discussed in detail below.

FIG. 1 is a schematic of an illustrative example of a multinodal processor arrangement 100, arranged in accordance with the present disclosure. Multinodal processor arrangement 100 generally includes an integrated circuit having a node array 102, which can be a processing node array. The node array 102 may include a particular number (N) of nodes 104(1) to 104(N), such as processing nodes, or a combination of processing nodes and memory devices. Any suitable number (N) of processing nodes 104 may be provided, including a single node. Each processing node 104(1) to 104(N) may generally be of any desired configuration including but not limited to a microprocessor (µP), a microcontroller (µC), a digital signal processor (DSP), etc., or any combination thereof. Thus, each processing node 104(1) to 104(N) may include logic for executing program or software instructions, as well as other functional blocks, such as, e.g., an arithmetic logic unit (ALU), a floating point unit (FPU), a digital signal processing (DSP) node, registers, accumulators, etc.

The multinodal processor arrangement 100 may include any combination of dedicated or shared resources. A dedicated resource may be, e.g., a resource 106 dedicated to a single processing node 104, such as a dedicated level one cache, and/or may be a shared resource 108 dedicated to any subset of the processing nodes 104. A shared resource may be, e.g., a shared resource 110 shared by all of the nodes 104(1) to 104(N), such as a shared level one or a level two cache and/or a shared external bus 112 supporting an interface between the multinodal processor arrangement 100 and another component 114 (such as, but not limited to, input-output (I/O) devices, external sensors, or the like, or may be a resource shared by any subset of the processing nodes 104).

As will be described further with respect to FIG. 2, the multinodal processor arrangement 100 may further include one or more cache controllers 124 configured to execute control logic for accessing and manipulating the contents of the dedicated cache resources 106 and/or shared resources 108, 110. In addition to a level one cache and/or level two cache, a shared resource 108, 110 may also include main memory 120, which may be any suitable form of memory including, but not limited to, e.g., volatile memory such as random access memory (RAM), non-volatile memory such as read only memory (ROM) or flash memory storage, data storage devices such as magnetic disk storage (e.g., hard disk drive or HDD), tape storage, optical storage (e.g., compact disk or CD, digital versatile disk or DVD), or other machine-readable storage mediums and/or computer-accessible mediums that may be removable, non-removable, volatile or non-volatile.

The multinodal processor arrangement 100 may have any suitable number of processing nodes 104(1) to 104(N). For example, the multinodal processor arrangement 100 may have two (2) nodes, four (4) nodes, tens of nodes, and even hundreds or more of processing nodes. Some examples of the multinodal processors may be homogeneous, such that each of the processing nodes use a single node design. Other examples of the multinodal processors may be heterogeneous, such that one or more of the processing nodes may be different from one or more of other processing nodes, and/or each node or subset of nodes may be optimized for a different role in the multinodal processor arrangement 100.

The multinodal processor arrangement 100 may also include a core/node controller or a core/node interface 116. The core/node controller 116 may be configured to determine which processing tasks are to be processed by each processing node 104(1) to 104(N). One or more routing functions or devices, such as a router, switch or a combination of routers and switches 118 may also be configured to route data between the individual nodes 104(1) to 104(N). In some examples, the processing tasks may be routed to selected processing nodes using the routers and/or switches 118.

FIG. 1 is intended to portray an illustrative functional block diagram of an example of the multinodal processor arrangement 100 and does not necessarily illustrate the physical location of the components illustrated therein. It is appreciated that the multinodal processor arrangement 100 described herein is illustrative and that variations and modifications are possible. Design choices may be driven by, for example, considerations of hardware size and complexity versus performance, thermal energy and heat dissipation, processor speed, overall throughput, etc. For example, the illustrated topology may be used to connect processing nodes 104(1) to 104(N) to a storage arrangement, such as a memory bank having a router. In additional examples, a multinodal processor may include processors on separate integrated chips.

As may be appreciated by one skilled in the art having read the present disclosure, the multinodal processor arrangement 100 may be provided in a suitable computing environment, such as a personal computer (PC). The computing environment may include the multinodal processor arrangement 100, system memory, one or more buses, and one or more input/output (I/O) devices, such as a keyboard, mouse, touch screen, display device, such as a conventional CRT, LCD, or Plasma based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), or any other suitable bus protocol, and connections between different devices may use different protocols. A PC or other suitable computer device may operate in a networked environment using logical connections to one or more remote computers. Such remote computers may be, for example, other PCs, servers, routers, network PCs, peer devices, or other common network nodes. Logical connections may comprise, for example, a local-area network (LAN) or a wide-area network (WAN).

Figure 2:
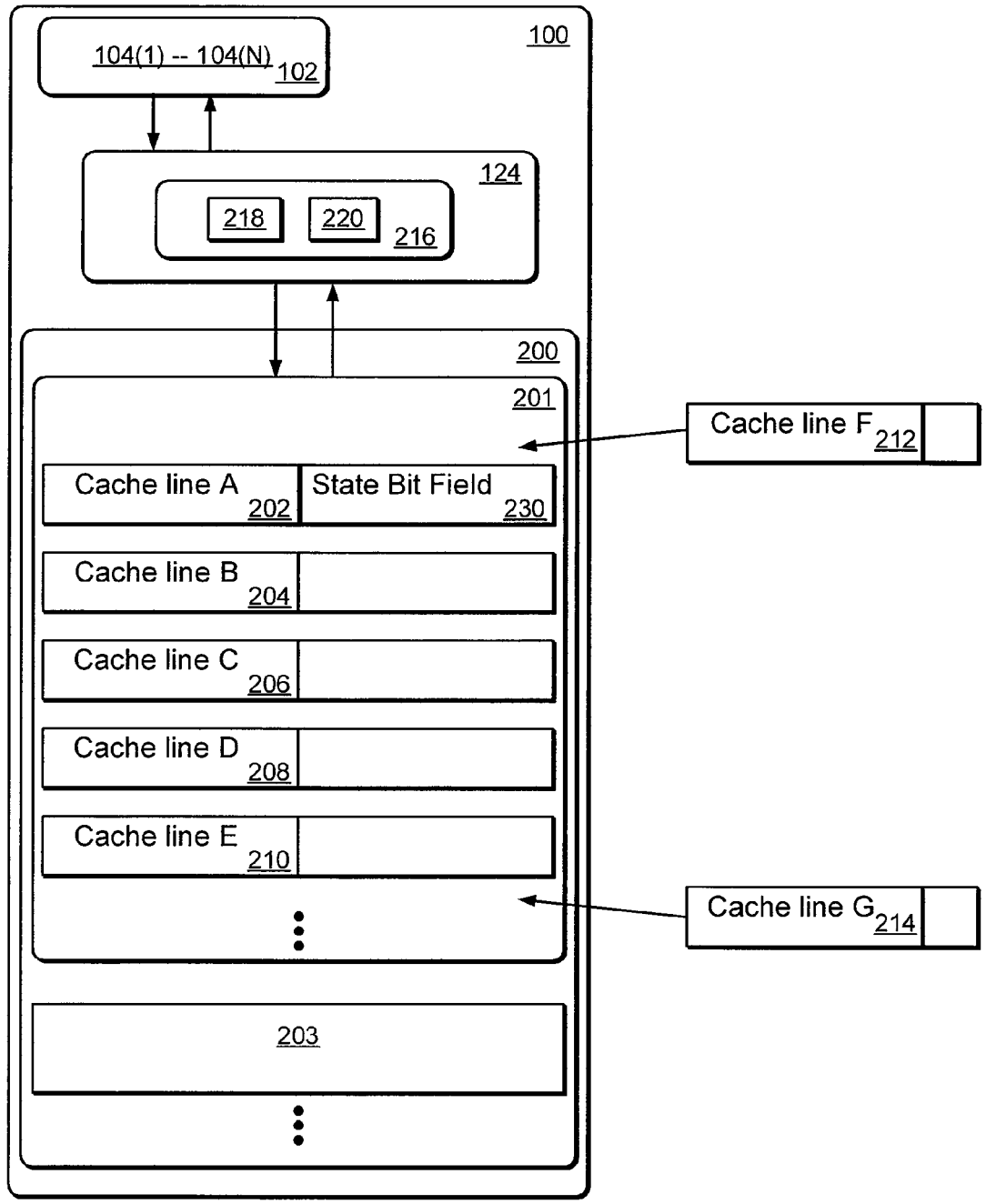
FIG. 2 is an illustrative block diagram illustrating one example of a system for burst-based dead block prediction, in accordance with the present disclosure.

FIG. 2 is an illustrative block diagram illustrating one example of a system for burst-based dead block prediction, in accordance with the present disclosure. As shown in FIG. 2, techniques for burst-based prediction may be implemented in a cache 200 in a multinodal processor environment, such as that illustrated in FIG. 1.

The system of FIG. 2 includes a multinodal processor arrangement 100 having a cache 200, which may be shared or private cache and may be directly mapped. Cache 200 may have one or more cache sets 201, 203 shared by the processing nodes 104(1) to 104(N) of the node array 102 In another embodiment, the multinodal processor arrangement may have multiple caches that are private to each node. The system may also include a cache controller 124, which may be coupled to the plurality of processing nodes 104(1) to 104(N) and to the cache 200. The cache controller 124 may be configured to receive requests to load memory blocks into the a cache set 201, 203 in the cache 200. For example, as shown in FIG. 2, the cache controller 124 may be responsive to a request to load memory block F 212 into a cache set 201 of the cache 200. The cache controller 124 may also manage previously loaded cache blocks, such as cache blocks A 202, B 204, C 206, D 208 and E 210. Memory blocks, such as memory block F 212, may be loaded into a cache set 201 of the cache 200 as cache blocks. Such memory blocks may be provided from any memory or storage component that is separate from the cache 200, such as main memory 120 (as shown in FIG. 1) or any other external or on-chip storage component.

In some examples used herein, a cache client may be a device or process which accesses the cache 200. Cache clients can include, for example, node array 102 and/or any individual processing node(s) 104(1) to 104(N). The cache controller 124 may further be configured to provide a cache client with access to the stored cache blocks 202 to 210. The cache controller 124 also can be configured to mark any of the stored cache blocks 202 to 210 for eviction from the cache set 201, as shown in FIG. 2, for example, with respect to cache block G 214. For example, a cache block may be marked for eviction if any of the cache blocks 202 to 210 are predicted as dead blocks, or if a cache set 201 in the cache 200 is full and space is needed in the cache set 201 for new memory blocks. A cache block may be marked for eviction by using a bit indicator for indicating that the block is "dead", or by moving the block to the LRU position (or some other designated position) of the cache set 201.

Additionally, the cache controller 124 may be configured to execute control logic that may include a dead block predictor 216. Dead block predictor 216 may be implemented as hardware and/or software. In one example, the dead block predictor 216 may include a data structure, such as a predictor table 218, adapted to determine whether a block should be marked for eviction from the cache set 201. The dead block predictor 216 may also include a second data structure, such as a history table 220, which may be used when implementing a trace-based dead block predictor. The cache controller 124 may also be configured to write a state bit field 230 to each cache block 202 to 214. The state bit field 230 can be used to record information associated with the cache bursts received by each block 202 to 214. For example, the state bit field 230 may be periodically updated as the cache blocks 202 to 214 are accessed by a cache client, such as when the block 202 to 214 is moved from a MRU to a non-MRU position in the cache set 201. As will be described in further detail with respect to FIG. 3, the state bit field 230 may be based on a count of cache bursts received by the cache block 202 to 214 and/or a trace of cache bursts received by the memory block 202 to 214.

Figure 3:
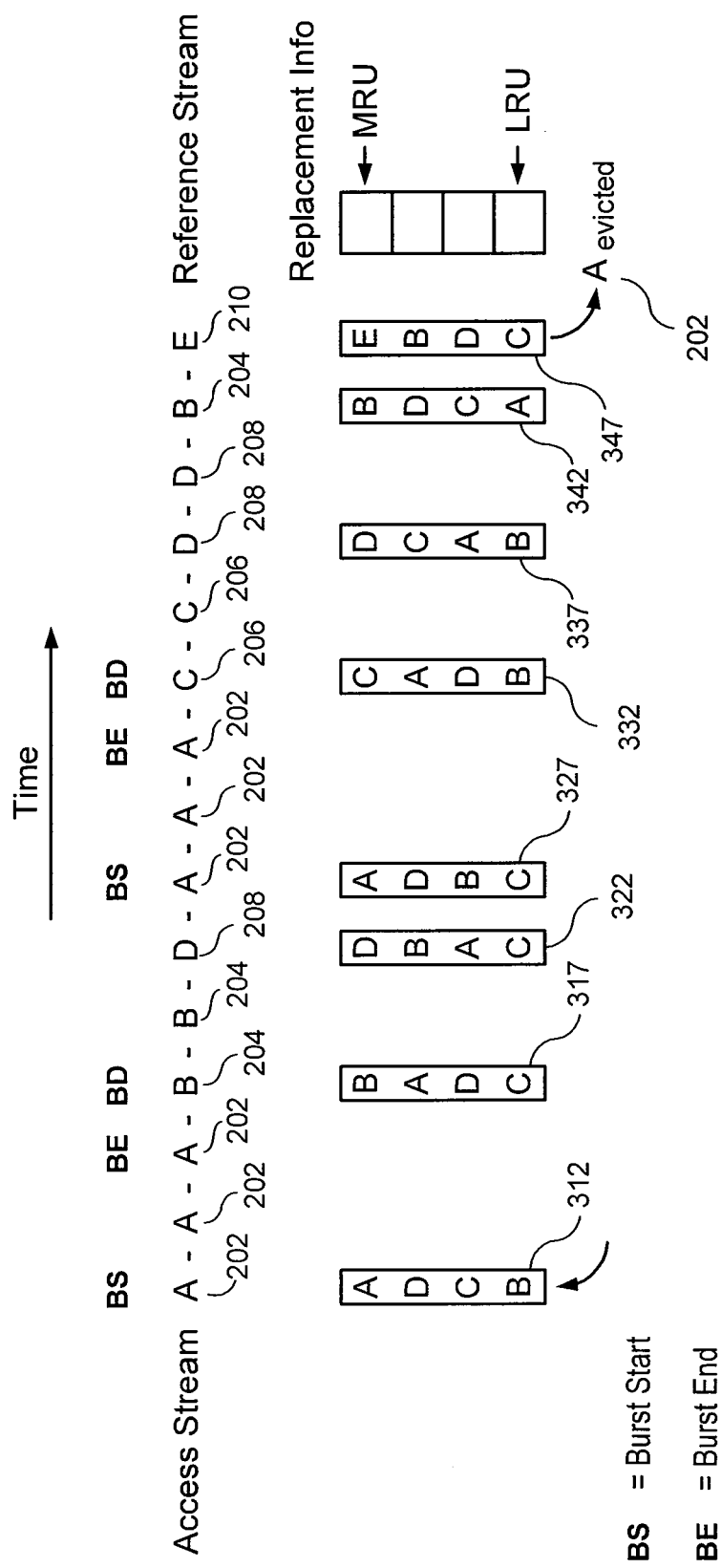
FIG. 3 is an illustrative example of an access stream to cache blocks in the system for burst-based dead block prediction such as shown in FIG. 2, in accordance with the present disclosure.

FIG. 3 is an illustrative example of an access stream to cache blocks in the system for burst-based dead block prediction shown in FIG. 2, in accordance with the present disclosure. As shown in FIG. 3, an access stream may include multiple accesses to various cache blocks A 202, B 204, C 206, D 208 and E 210, in a cache set 201 within a cache 200 (as shown in FIG. 2), which may be shared or private. The accesses to the cache blocks 202, 204, 206, 208, 210 may be made, for example, by the processing nodes 104(1) to 104(N) in multimodal processing arrangement 100 and/or by the arrangement 100 itself.

A first access received by a cache block, plus any subsequent contiguous accesses received by the cache block following the first access while the block is in the MRU position is what is referred to herein as a cache burst. For example, a single cache block A 202 may be accessed multiple times in a row without any intervening references to any of the other memory blocks (e.g., cache blocks B 204, C 206, D 208, and/or E 210 stored in the same cache set 201 as cache block A 202 in cache 200). The first access to the block is the start of the cache burst. Once another block (e.g. cache block B 204) is accessed, cache block A 202 may be moved out of the MRU position of the cache set 201 to a non-MRU position, and the other block (e.g., cache block B 204) may be moved into the MRU position of the cache set 201. The cache burst of block A 202 is completed on the third and last reference to block A 202, and may be detected when block B 204 is accessed.

Referring to FIGS. 2 and 3, a cache burst of cache block A 202, may be detected upon access to another memory block, (e.g., cache block B 204). At this point, the state bit field 230 of the cache block 202 may be updated to account for the cache burst received by cache block A. The dead block predictor 216 may then make a prediction as to whether the block is "dead," (e.g., whether block A 202 is expected to be evicted from the cache set 201 prior to the next access to block A 202). The state bit field 230 of the other blocks B 204, C 206, D 208 and E 210 in the cache set 201 may be similarly updated. For example, with respect to the access stream shown in FIG. 3, the end of a cache burst of block B 204 may be detected upon access 320 to block D 208, after two contiguous accesses to block B. Similarly, the end of a cache burst of block D 208 may be detected upon access 327 to block A 202 after a single access to block D 208. After the cache burst to block D, a second cache burst of block A 202 may be detected upon access 332 to block C 206. Continuing, a cache burst to block C may be detected upon access 337 to block D 208. A second cache burst of block D 208 may then be detected upon access 342 to block B 204. Finally, in the example of FIG. 3, a second cache burst of block B 204 may be detected upon access to block E 210.

As shown in FIG. 3, cache block A 202 may occupy the MRU position of the cache set 201 upon access 312 of block A 202 by the cache client. Upon access 317 to another block in the cache, such as block B 204, the cache burst for block A 292 may be detected. Block A 202 may then be moved from the MRU position to a lower position of the stack, and block B 204 may be loaded into the MRU position of the cache set 201. Cache blocks D 208 and C 206, which may have been accessed before block A 202 and may already occupy memory locations in the cache, may also be shifted to lower positions of the stack so that block C 206 may occupy the LRU position upon access 317. Similarly, upon access 322 to block D 208 in the cache, the cache burst for block B 204 may be detected. Block B 204 may then be moved from the MRU position to an intermediate position in the cache (e.g., the next accessed block in access 327), and block A 202 may be loaded into the MRU position of the cache. Cache block B 204 may then be moved to a lower position of the stack, and block C 206, which has not yet been accessed in this example, may remain in the LRU position. Upon access 332 to block C 206, block C 206 may be moved from the LRU position to the MRU position of the cache set 201, and the end of the second cache burst of block A 202 may be detected. Access 332 also results in blocks A 202 and D 208 being moved in this example to lower positions of the cache set 201 and block B 204 being pushed down to the LRU position of the cache set 201. The end of the cache burst of block C 206 may be detected upon access 337 to block D 208. Following access 337, block D 208 is moved to the MRU position of the stack and block C 206 may be moved from the MRU position to a lower position of the cache set 201. Block B 204 may remain in the LRU position of the stack until accessed in access 342, at which point block B 204 may be moved to the MRU position of the cache set 201, and block A 202 may be moved to the LRU position of the stack.

Block A 202 may be evicted from the cache set 201 upon the next access 347 to a new memory block E 210, which is not currently in the cache set 201 (e.g. memory block E 210 may reside in an external memory location that is separate from the cache set 201). As shown in FIG. 3, if the cache set 201 is full, block A 202, currently occupying the LRU position, may be evicted from its cache set 201 in the cache 200 to create storage space for the new block E 210. Block E 210 may then be loaded into the MRU position of the cache set 201 to replace the evicted block A 202. Accordingly, the other blocks in the cache set 201, for example, blocks B 204, D 208 and C 206 may all be shifted to lower positions in the stack so that block C 206 now occupies the LRU position.

The dead block predictor 216 of the cache controller 124 (shown in FIG. 2) may be "trained" as to a count or a trace of cache bursts received by a given block (e.g., block A 202) before it is predicted as "dead" and evicted from the cache set 201. As will be explained in more detail with respect to FIG. 5, a count-based predictor 216 may be configured to read the state bit field 230 of the cache block A 202 that can indicate how many cache bursts that the block A 202 received. This information can be used by the predictor to determine a certain number of cache bursts, e.g., two cache bursts, before the block is predicted to be "dead," i.e., not expected to be accessed again prior to eviction. This information can be stored in a data structure in the predictor, such as in the predictor table 218, to identify the block as a "dead block." On future occurrences of cache block A 202, the count-based predictor may predict a block is dead and the cache controller 124 can mark the cache block 202 for eviction based on the number of bursts received by the block 202 (e.g., after two cache bursts). Thus, a count of cache bursts may be used as a property for predicting when a block is a "dead block." This information may also be stored in the predictor table 218.

On the other hand, as will be explained in more detail with respect to FIG. 4, an alternate method employs a trace-based predictor. In the trace-based predictor, the state bit field 230 of the block 202, may contain a combination of program counters ("PCs") of the memory accesses that ended each cache burst received by the block 202. The trace of a block may begin when the block is loaded into the cache set, and end when the block is evicted from the cache. Thus, the trace-based predictor can combine a series of PCs of burst-ending accesses for the block 202 before that block is considered "dead" and store this information, such as in a predictor table 218. Based on the predictor 216, the cache controller 124 may begin marking the cache block 202 for eviction based on the series of PCs received by the block. Thus, the PC's of cache bursts may be used as a property for predicting when a block is a "dead block."

Figure 4:
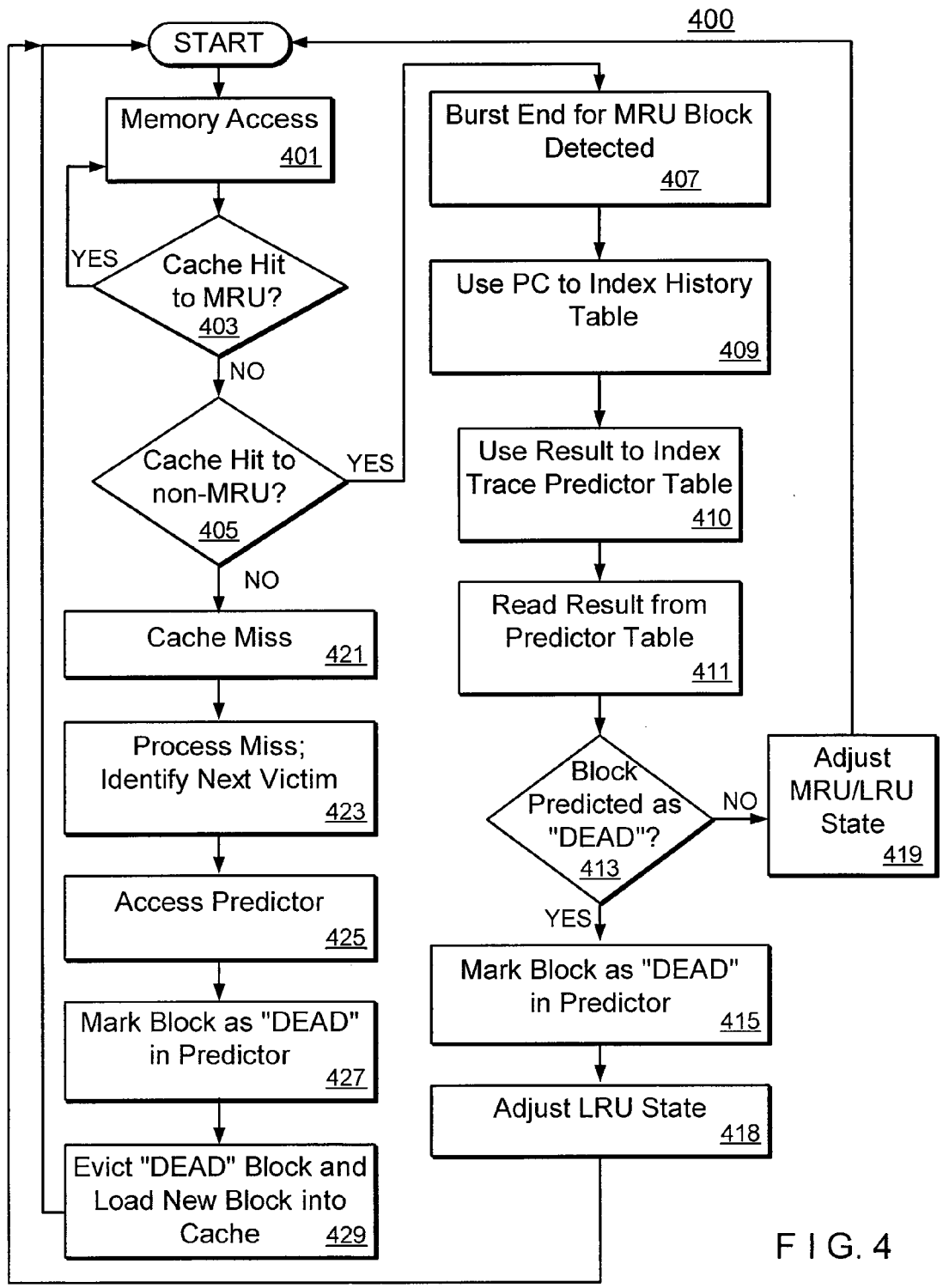
FIG. 4 is a flow diagram illustrating one example of a method for burst-based dead block prediction using a trace-based prediction technique, in accordance with the present disclosure.

FIG. 4 is a flow diagram illustrating one example of a method 400 for burst-based dead block prediction using a trace-based prediction technique, in accordance with the present disclosure. Method 400 may be implemented in a multinodal processing environment, such as that illustrated in FIG. 2. Method 400 may include one or more processing operations, functions, actions or modules as illustrated by blocks 401, 403, 405, 407, 409, 411, 413, 415, 417, 419, 421, 423, 425, 427 and/or 429. Although divided into discrete blocks, one or more of the illustrated by blocks may be combined together or further divided as may be required in a particular implementation. In some implementations, one or more of the illustrated blocks may be eliminated and/or replaced.

Processing for method 400 may begin at block 401. In block 401, a multinodal processor arrangement 100 (as shown in FIG. 2) may be adapted to access a first memory block, which may be a cache block or a memory block external to the cache 200. Block 401 may be followed by block 403. In block 403, method 400 may determine whether the first memory block is stored currently in the MRU position of the relevant set in the cache 200. If in block 403 it is determined that the access to the first memory block in block 401 was to the MRU in the cache set 201, then block 403 may be followed by block 401, where method 400 may await the next memory access. If, in block 403, method 400 determines that the first memory block is not in the MRU position, then processing may continue to block 405. In block 405, the access from block 401 is tested to determine if the access is to a non-MRU position in the cache set 201. If the access is determined to be to a non-MRU position, then block 405 may be followed by block 407, where the cache controller 124 may mark the block access as having generated a burst-ending cache hit. In block 407 the cache controller may update the state bit field 230 of the last cache block in the MRU, i.e., the block that is being replaced by the first cache block, to indicate that the cache burst for the last cache block has ended. Block 407 may be followed by block 409.

In block 409, the program counter ("PC") of the last access to the cache block in the MRU position may be used to index a history table 220 (FIG. 2) storing a series of prior burst-ending accesses received by the cache block. Alternatively, the PC of the first cache block may be used to index the history table 220, or, alternatively, the position of the block in the cache, or the address of the block. In block 410, the PC of the last access to the cache block in the MRU position that is moving out of the MRU position may then be successively combined with the PCs of the previous accesses, such as by using an XOR operation. The result of the XOR operation may then be used to derive an address corresponding to an entry in the predictor table 218, which may be a look-up table. The data stored as an entry of the predictor table 218 at the derived address may indicate whether the block is dead, for example, using a bit indicator. Block 409 may be followed by block 411.

In block 411, the predictor results stored in a predictor table 218 may be read or otherwise retrieved for evaluation. Processing may continue from block 411 to block 413. In block 413, method 400 may determine whether the block is predicted to be a dead block. In a trace-based predictor, the history table 220 may contain a series of combined PCs representing accesses triggering a burst end of the first block from the time that the block is loaded into the cache to the time that it is evicted from the cache, i.e., when the block is not expected to be accessed again, or "dead." The predictor table 218 may be populated by successively combining the series of PCs representing accesses triggering a burst end of the first block before it is determined to be "dead" from the history table, using an XOR function. The result obtained by combining the PCs of the burst-ending accesses may correspond to an address of an entry in the predictor table 218, and the entry may indicate whether the block is "dead" or "alive." If the entry in the table indicates that the block is "dead," then in block 415, the first cache block may be marked as a "dead" block. Otherwise, the cache block may be determined to be active or not "dead." The values populating the history table 220 and the predictor table 218 may be obtained during the "training" phase of the first cache block, as discussed above with respect to FIG. 3.

If the cache block is determined to be dead in block 413, then processing may continue from block 413 to block 415. If the cache block is not predicted as a dead block in block 413, block 419 may follow. In block 419, the MRU/LRU stack may be updated. For example, the first cache block in the set may be moved into the MRU position, the last block (the block that occupied the MRU position before being replaced by the first cache block) may be moved into an LRU position of the cache set, or some intermediate position between the MRU position and the LRU position, and another block in the cache set 201 may be pushed into the LRU position of the cache set. Block 419 may be followed by block 401, where another memory block may be accessed.

Figure 7:
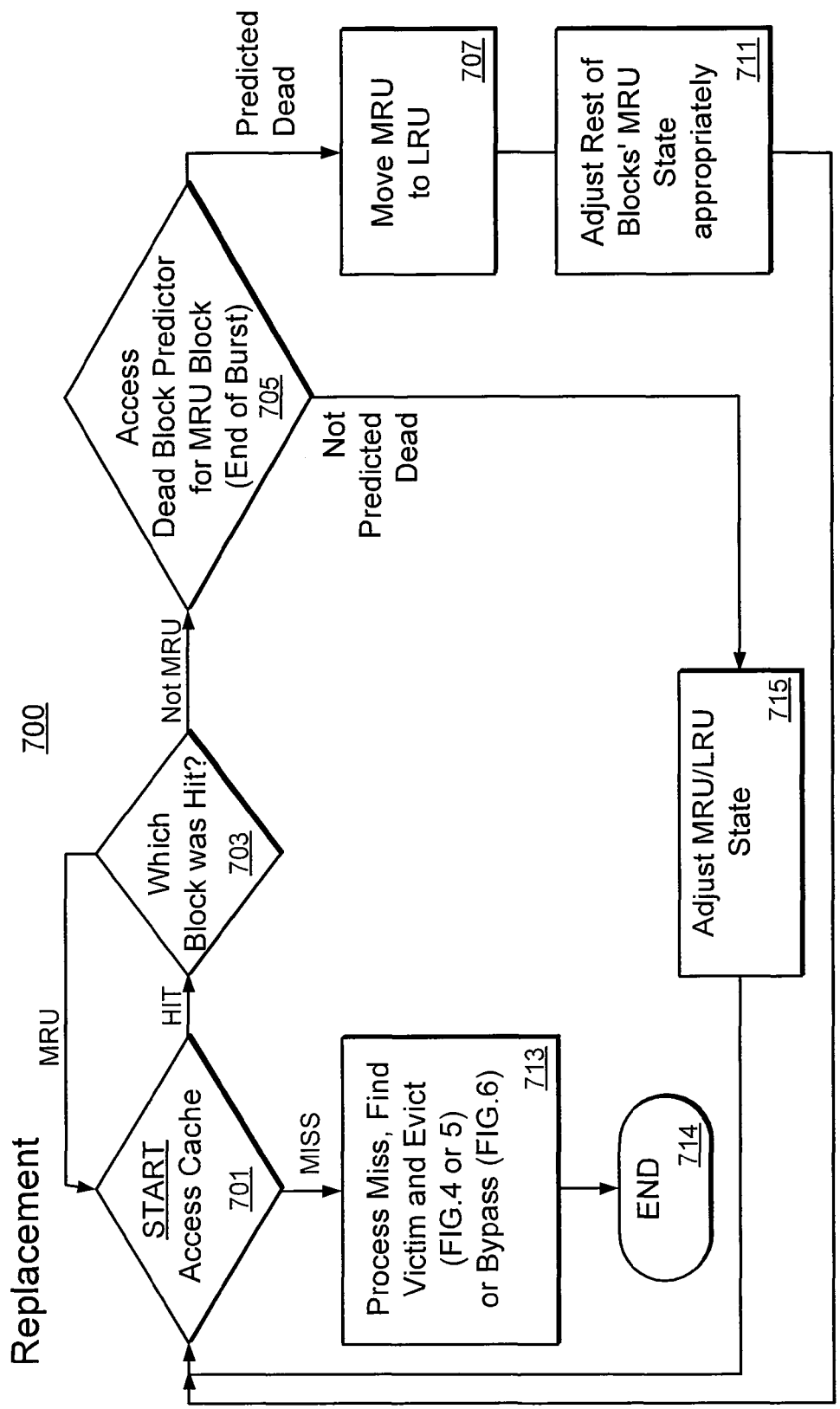
FIG. 7 is a flow diagram illustrating one example of a method for cache replacement, in accordance with the present disclosure.
Figure 8:
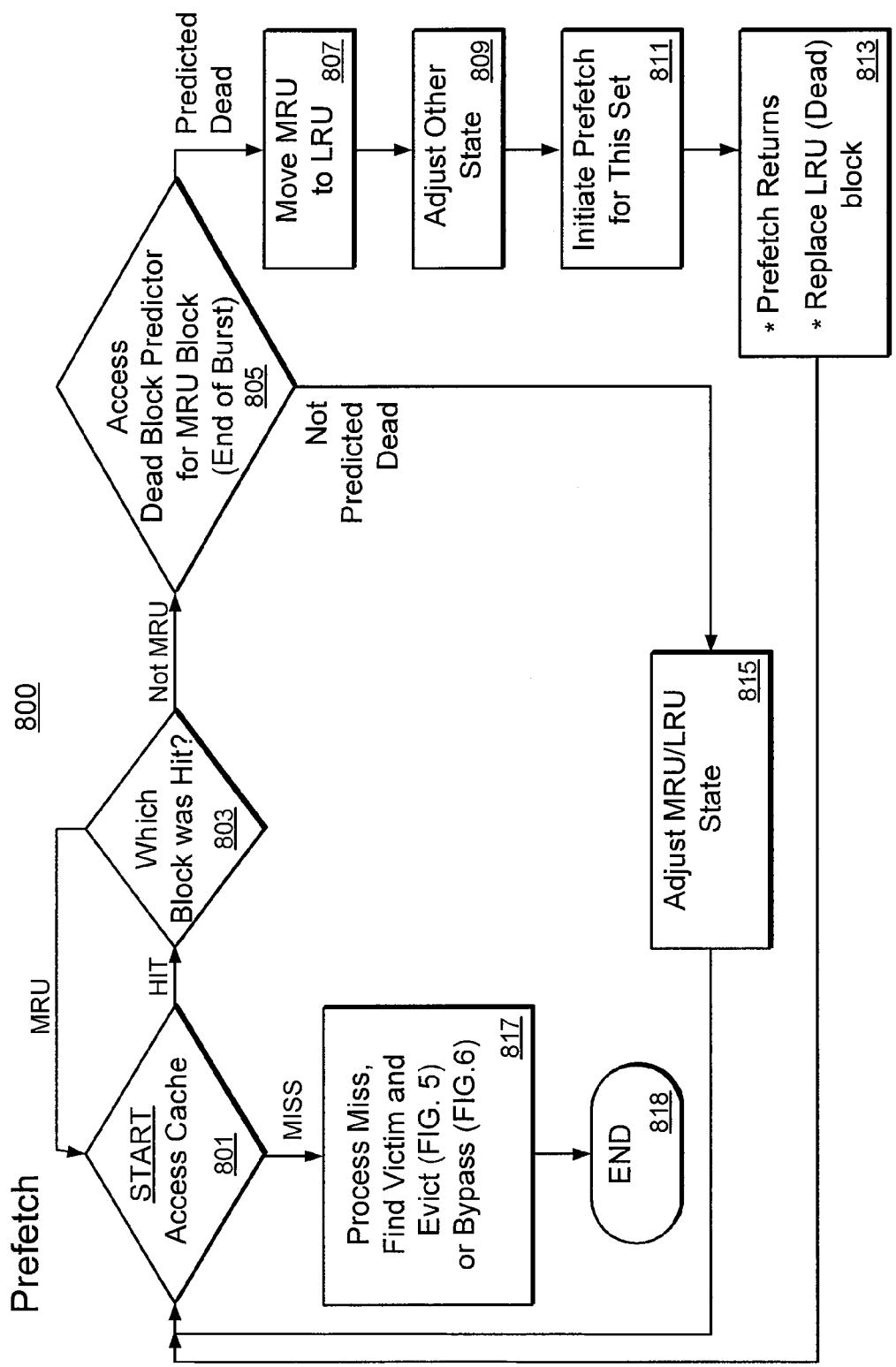
FIG. 8 is a flow diagram illustrating one example of a method for cache prefetching, in accordance with the present disclosure.

In block 415, the first cache block may be marked for eviction and/or replaced using a replacement and/or prefetching method, examples of which are described with respect to FIGS. 7-8. Block 415 may be followed by block 418, where the first cache block, now identified as a dead block, may be moved to the LRU position of the cache set. Block 418 may be followed by block 401, in which another memory block is accessed.

Returning to block 405, if the memory access was not to a non-MRU position, block 421 may follow. In block 421 the cache controller 124 may be arranged to mark the block access as having generated a cache miss. Block 421 may be followed by block 423. In block 423, since the cache set 201 may be full, the cache controller may be configured to select a "victim" block to evict and replace with the new block being accessed. The "victim" block may be, for example, the cache block located in the LRU position of the cache set. At this point, the trace of the "victim" block may be updated in the history table 220, and the predictor "trained" as to the appropriate series of PCs of burst-ending accesses triggering the "death" of the "victim" block. For example, block 423 may be followed by block 425, where the cache controller 124 may be configured to access the predictor 216 and update the predictor table 218 with the information contained in the state bit field 230 of the "victim" block. Block 425 may be followed by block 427, where the prediction table 218 may further be updated to indicate that "victim" block should be indicated as a "dead" block, so that the predictor 216 may later reference the contents stored at a derived address location in the predictor table 218 to determine whether the "victim" block should be marked as a "dead" block, such as previously described in blocks 407-413. Processing may continue from block 427 to block 429, where the "victim" block may be evicted from the cache set, and the new memory block may be loaded into the cache set.

Figure 5:
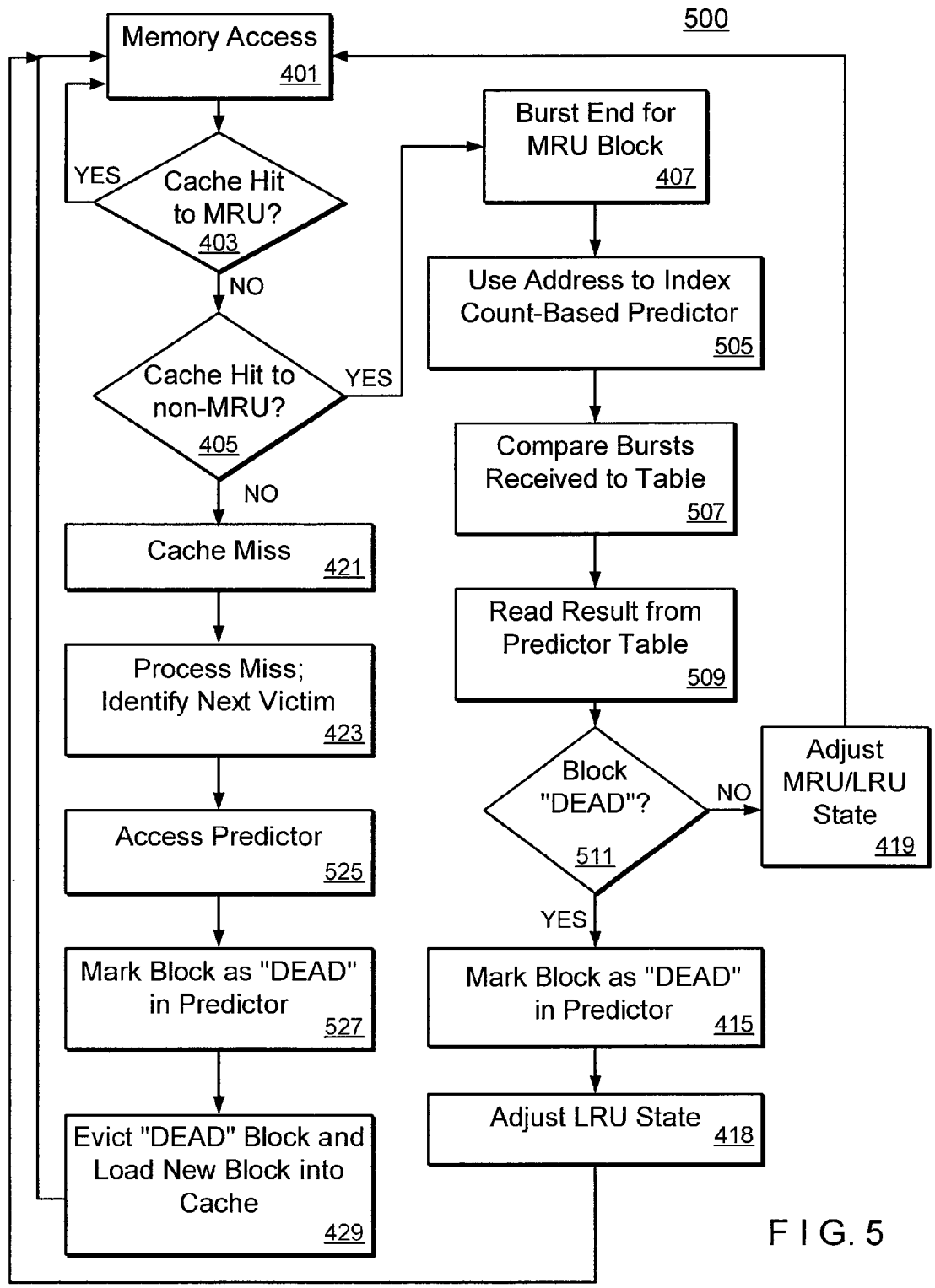
FIG. 5 is a flow diagram illustrating one example of a method for burst-based dead block prediction using a count-based prediction technique, in accordance with the present disclosure.

FIG. 5 is a flow diagram illustrating one example of a method 500 for burst-based dead block prediction using a count-based prediction technique, in accordance with the present disclosure. The method of FIG. 5 may be implemented in the multinodal processor environment such as illustrated in FIG. 2. Method 500 may include one or more processing operations, functions, actions or modules as illustrated by blocks 401, 403, 405, 407, 505, 507, 509, 511, 415, 418, 419, 421, 423, 525, 527 and/or 429. Method 500 is substantially similar to method 400 which is described above in connection with FIG. 4, except that blocks 505, 507, 509, 511, 525 and 527 which perform a count-based prediction, replace blocks 409, 411, 424, 425 that implemented a trace-based prediction. Although divided into discrete blocks, one or more of the illustrated by blocks may be combined together or further divided as may be required in a particular implementation. In some implementations, one or more of the illustrated blocks may be eliminated and/or replaced. Processing for method 500 may begin at block 401.

In method 500, after the end of a cache burst is detected in block 407, the method may proceed to block 505. In block 505, the address of the most recent access to the block is used to index a predictor table 218 in a count-based predictor 216 in the cache controller 124. The count-based predictor 216 may use the predictor table 218 to store, for example, a threshold number of cache bursts that a block may receive before it is marked as "dead." The threshold number may be obtained during the "training" phase of the cache block, as discussed above with respect to FIG. 3, and as will be described below with respect to blocks 525-527.

In block 507, the number of cache bursts received by the block (stored in the state bit field 230) are compared to the threshold number stored in the predictor table. In block 509, the predictor 216 will determine whether the number of cache bursts received by the block is greater than or equal to the threshold number stored in the predictor table 218. If, in block 511, the number of cache bursts received by the block is greater than or equal to the threshold number, then the method 500 proceeds with block 415, in which the cache controller 124 marks the block as a "dead" block. Block 525 may follow block 423. In the event of a cache miss being detected in method 500, blocks 421 and 423 operated as described above. In block 525, the cache controller 124 may access the predictor 216 and update the predictor table 218 to reflect the number of bursts received by the "victim" prior to eviction from the cache set, which may be contained in the state bit field 230 of the "victim" block. In block 527, the threshold number stored in the predictor may further be updated to the number of bursts received by the "victim." The dead block predictor 216 may later reference the threshold number to determine whether the "victim" block should be marked as a "dead" block, such as in blocks 505, 507, 509 and 511, as previously described. The predictor, in blocks 525 and 527, is thereby "trained" to reflect the appropriate number of bursts that should be received by the "victim" block before its designation as a "dead" block. In block 429, the "victim" block may be evicted from the cache set, and the new memory block may be loaded into the cache set, as described above.

Figure 6:
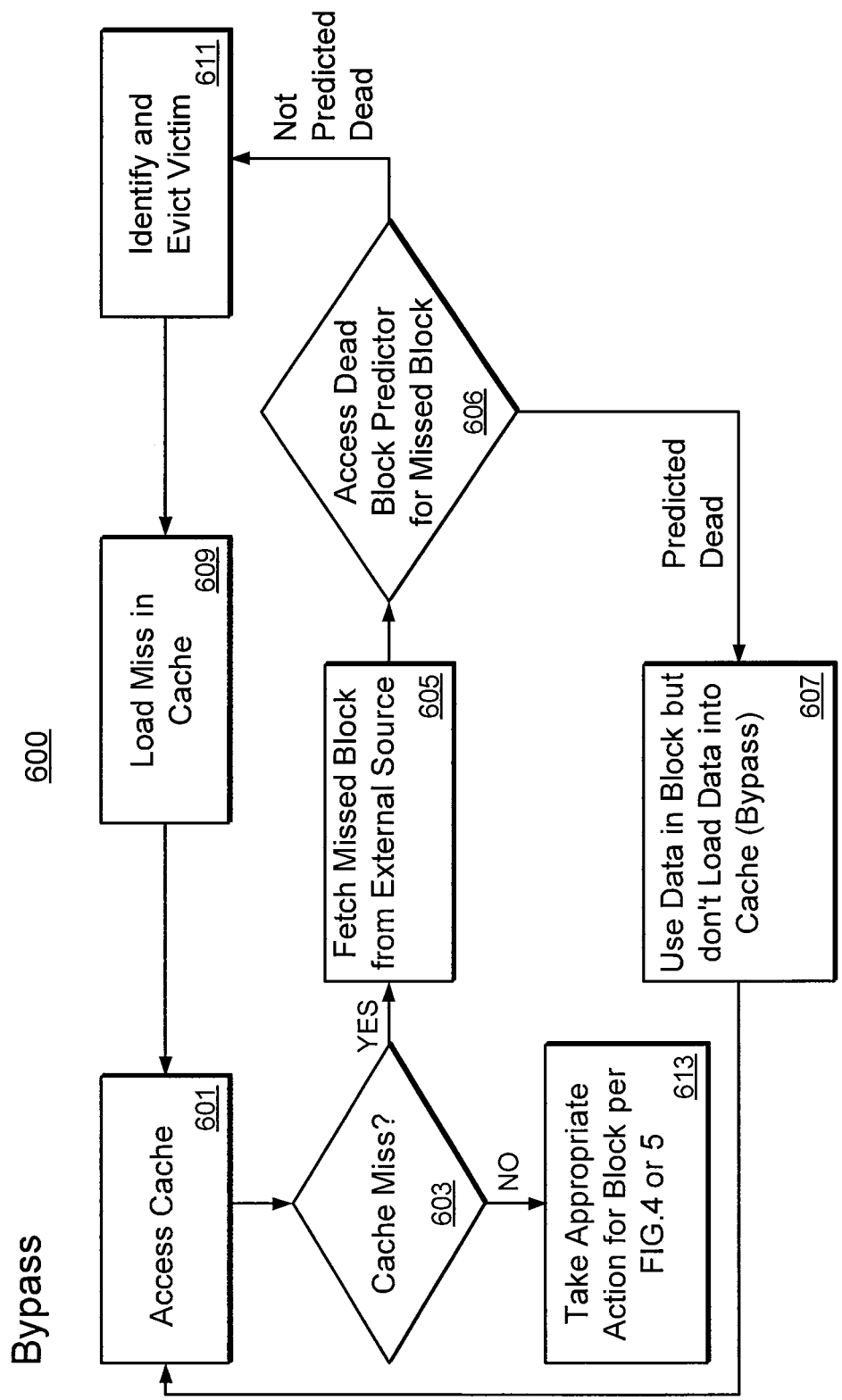
FIG. 6 is a flow diagram illustrating one example of a method for cache bypassing, in accordance with the present disclosure.

FIG. 6 is a flow diagram illustrating one example of a method for cache 600 bypassing, in accordance with the present disclosure. The method illustrated in FIG. 6 may be implemented as part of the methods illustrated in FIGS. 4-5, for example, as an alternative to blocks 421, 423, 425, 427 and 429, or in conjunction with any other method of dead block prediction. Method 600 may include one or more processing operations, functions, actions or modules as illustrated by blocks 601, 603, 605, 606, 607, and/or 613. Although divided into discrete blocks, one or more of the illustrated by blocks may be combined together or further divided as may be required in a particular implementation. In some implementations, one or more of the illustrated blocks may be eliminated and/or replaced. Processing for method 600 may begin at block 601.

In block 601, a multinodal processor arrangement 100 (as shown in FIG. 2) or processing nodes 104(1) to 104(N) of the multinodal processor arrangement 100 may be adapted to access a cache block in the cache set. Block 601 may be followed by block 603, where method 600 may determine if the memory block being accessed is a cache block that is stored in the cache set. Processing may continue from block 603 to block 613 when the memory block is found in the cache set 201 (e.g., a cache hit). Otherwise, processing may continue from block 603 to block 605 when the memory block is not found in the cache set 201 (e.g., a cache miss).

In block 613, the cache controller 124 may be arranged to use a trace-based or count-based predictor, as shown in FIGS. 4 and 5, respectively, to identify whether the cache hit is to a block that is in the MRU or non-MRU position, e.g., blocks 403 and 405 in FIG. 4 and/or FIG. 5, and perform any associated operations.

In block 605, the multinodal processor arrangement 100 may fetch the missed memory block from an external source. The external source can be any appropriate storage arrangement outside the cache set, such as from main memory 120 (as shown in FIG. 1). Block 605 may be followed by block 606. In block 606, the multinodal processor arrangement 100 may be arranged to access the dead block predictor 216 to determine whether the memory block being accessed would qualify as a "dead" block. If, in block 606 the predictor predicts that the block is dead, then block 606 may be followed by block 607. On the other hand, if, in block 606, the predictor predicts that the missed block is not "dead," then block 606 may be followed by block 611.

In block 607, the multinodal processor arrangement 100 may use the data in the block without loading the block into the cache set. This is referred to as a cache bypass. Block 607 may be followed by block 601 where additional cache blocks may be accessed.

In block 611, the cache controller may identify a block suitable for eviction, (e.g., a "dead" block in the cache set 201 may correspond to the "victim block"), and evict the "victim block." Block 611 may be followed by block 609, where the missed block may be loaded into the cache set. Block 609 may be followed by block 601 where additional cache blocks may be accessed.

FIG. 7 is a flow diagram illustrating one example of a method 700 for cache replacement, in accordance with the present disclosure. The replacement method illustrated in FIG. 7 may be implemented as part of the methods illustrated in FIGS. 4-5, for example, as an alternative to block 401, or in conjunction with any other method of dead block prediction. Method 700 may include one or more processing operations, functions, actions or modules as illustrated by blocks 701, 703, 705, 707, 711, 713, 714 and/or 715. Although divided into discrete blocks, one or more of the illustrated by blocks may be combined together or further divided as may be required in a particular implementation. In some implementations, one or more of the illustrated blocks may be eliminated and/or replaced. Processing for method 700 may begin at block 701.

In block 701, a multinodal processor arrangement 100 (as shown in FIG. 2) or processing nodes 104(1) to 104(N) of the multinodal processor arrangement 100 may be adapted to access a memory block. If, in block 701, the block is not found in the cache set, a cache miss, is detected. In this case, block 701 may be followed by block 713. If, in block 701, the block is found in the cache set, a cache hit is detected and then block 701 may be followed by block 703.

In block 713, the cache controller 124 may be process the cache miss and perform one or more of the blocks illustrated in FIGS. 4-5 for processing and evicting a victim block, e.g., block 423 and any associated blocks, or may alternatively use the bypassing method illustrated in FIG. 6. Block 714 may follow block 713. Block 714 represents the end of the cache replacement method 700. Alternatively, and not shown in FIG. 7, rather then method 700 ending, when additional memory blocks are to be accessed, block 701 may follow block 713 and method 700 can await the next memory access.

In block 703, the cache controller 124 may determine which cache block was hit (e.g., whether the memory block is in an MRU or non-MRU position of the cache set). If, in block 703, the cache block is determined to be in the MRU position, then block 703 may be followed by block 701, where the multinodal processor arrangement 100 may access another block in the cache set. However, if the cache block is determined to not be in the MRU position, then block 704 may be followed by block 705.

In block 705, the dead block predictor, such as illustrated in FIG. 4 or 5, may be accessed for the block occupying the MRU position, signifying the detection of the end of the cache burst for the block. If, in block 705, the block occupying the MRU position is predicted as a dead block, for example, using the count-based or trace-based methods illustrated in FIGS. 4 and 5, then, block 705 may be followed by block 707. On the other hand, block 705 may be followed by block 715 when the block occupying the MRU position is not predicted as a dead block.

In block 707, the MRU cache block may be moved from the MRU position to the LRU position in the cache set 201 and will thus be evicted when a new block is eventually loaded into that set. Alternatively, in another example, the block may be marked explicitly as a "dead" block, thereby being marked for replacement whenever a new block is brought into that set regardless of its position in the MRU-LRU chain. In this case, the cache block may be moved to an intermediate position between the MRU and LRU positions without being immediately evicted from the cache set. Block 707 may be followed by block 711, where the position of the other cache blocks in the stack may be shifted accordingly. For example, the cache block being accessed may be loaded into the MRU position of the stack while the other cache blocks may be pushed lower on the stack in non-MRU positions. Block 711 may be followed by block 701 when additional memory blocks are to be accessed.

In block 715, the cache block may be pushed lower on the stack so that the cache block being accessed occupies the MRU position and the cache block formerly occupying the MRU position may occupy an intermediate non-MRU position between the MRU and LRU positions. Block 715 may be followed by block 701 when additional memory blocks are to be accessed.

FIG. 8 is a flow diagram illustrating one example of a method 800 for cache prefetching, in accordance with the present disclosure. The prefetching method 800 illustrated in FIG. 8 may be implemented as part of the methods illustrated in FIGS. 4-5, for example, as an alternative to block 401 or in conjunction with any other method of dead block prediction. Method 800 may include one or more processing operations, functions, actions or modules as illustrated by blocks 801, 803, 805, 807, 809, 811, 813, 815, 817 and/or 818. Although divided into discrete blocks, one or more of the illustrated by blocks may be combined together or further divided as may be required in a particular implementation. In some implementations, one or more of the illustrated blocks may be eliminated and/or replaced. Processing for method 800 may begin at block 801.

In block 801, a multinodal processor arrangement 100 (as shown in FIG. 2) or processing nodes 104(1) to 104(N) of the multinodal processor arrangement 100 may access a memory block. If, in block 801, the block is not in the cache set 201, there is a cache miss and block 801 may be followed by block 817. In block 817, the cache controller 124 may perform block 423 illustrated in FIGS. 4-5 for processing and evicting a victim block, or may alternatively use the bypassing method illustrated in FIG. 6. Block 818 may follow block 817. Block 818 represents the end of the cache prefetching method 800. Alternatively, and not shown in FIG. 8, when additional memory blocks are to be accessed, block 801 may follow block 817 and method 800 can await the next memory access.

If, in block 801, the block is in the cache set, then block 803 may follow. In block 803, the cache controller 124 may determine whether the block is in an MRU or non-MRU position. If, in block 803 the block is in the MRU position, then block 801 may follow. However, if, in block 803, the block is not in the MRU position, then block 803 may be followed by block 805. In block 805, the predictor is accessed for the block occupying the MRU position, signifying the end of the cache burst for the block. If, in block 805, the block occupying the MRU position is predicted as a dead block, for example, using the count-based or trace-based methods illustrated in FIGS. 4 and 5, then block 807 may follow. In block 807, the block may be moved from the MRU position to the LRU position and subsequently evicted from the cache set 201 when a new block is moved into the cache set. Block 809 may follow block 807. In block 809, the MRU/LRU state of the other blocks in the stack may be adjusted accordingly. In block 811, a new block is "prefetched," i.e., chosen for loading into the cache set 201 to replace the evicted block. Block 813 may follow block 811. In block 813, the prefetched block may be loaded into the cache set 201, thereby replacing the evicted block in the cache set 201.

If, however, in block 805, the block occupying the MRU position is not predicted as a dead block, then block 815 may follow. In block 815, the block occupying the MRU position is pushed lower on the stack so that the block being accessed occupies the MRU position and the block formerly occupying the MRU position occupies an intermediate non-MRU position between the MRU and LRU positions. Block 801 may follow block 815.

Figure 9:
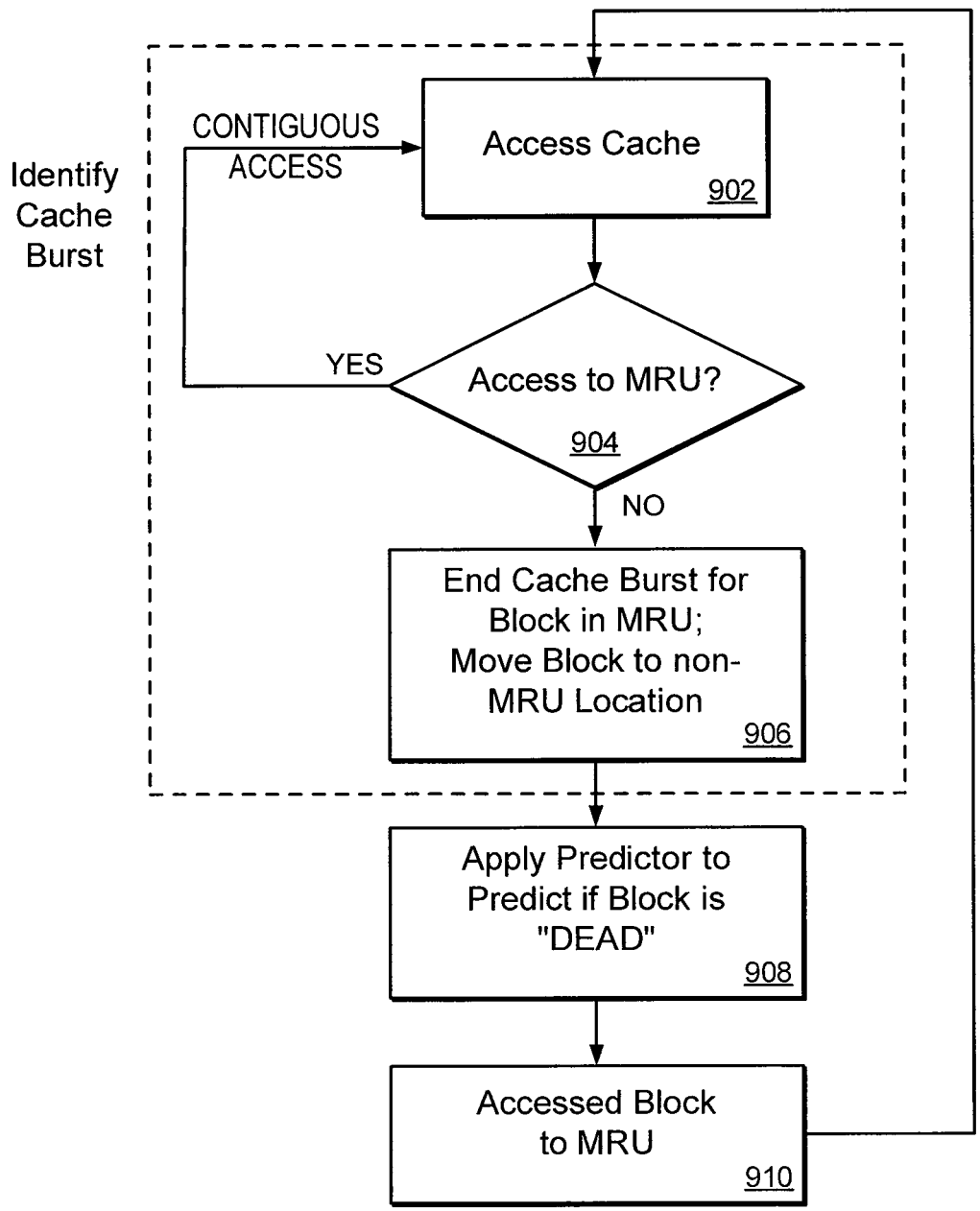
FIG. 9 is a flow diagram of an example of a method for a cache controller to identify dead cache blocks in a cache memory, in accordance with the present disclosure.

FIG. 9 is a flow chart illustrating an example of a method 900 for a cache controller to identify dead blocks in a cache memory in accordance with the present disclosure. Method 900 may include one or more processing operations, functions, actions or modules as illustrated by blocks 902, 904, 906, 908 and/or 910. Although divided into discrete blocks, one or more of the illustrated by blocks may be combined together or further divided as may be required in a particular implementation. In some implementations, one or more of the illustrated blocks may be eliminated and/or replaced. Processing for method 900 may begin at block 902.

In block 902, the cache set 201 may be accessed by a cache client. Block 902 may be followed by block 904. In block 904, the cache controller 124 may be adapted to determine whether the cache access is to the MRU location in the cache set. If in block 904, it is determined that the cache access is to the MRU location, then the current cache burst may continue due to contiguous access to the MRU, and processing may continue at block 902 with the next cache access operation. If, in block 904, the cache access was not to the block in the MRU location, the processing may continue to block 906, where the cache burst for the accessed block currently in the MRU position may be identified as ended and that accessed block in the cache set 201 may be moved to a non-MRU location in that set. Collectively, blocks 902, 904 and 906 may operate to identify a cache burst. Block 906 may be followed by block 908.

In block 908, a dead block predictor, such as described above in FIGS. 4 and 5, may be adapted to predict whether the accessed block whose cache burst ended may be "dead." Processing may continue from block 908 to block 910. In block 910, the accessed block may be moved to the MRU position in the cache set 201 and a new cache burst for that block begins. Processing may continue from block 910 to block 902 where additional cache blocks may be accessed.

Figure 10:
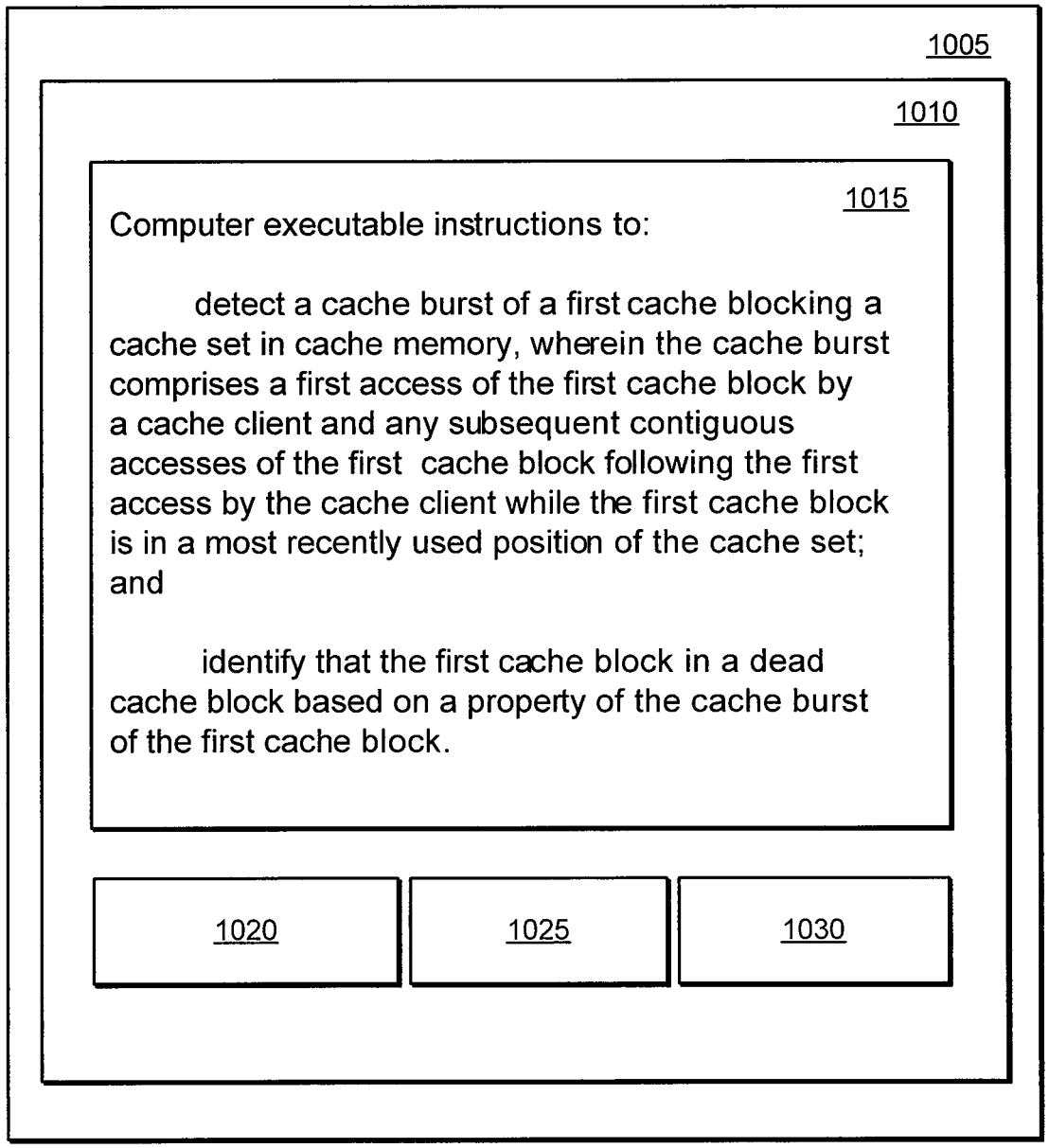
FIG. 10 is a block diagram of a computer program product for identifying dead cache blocks in a cache memory, in accordance with the present disclosure.

FIG. 10 is a block diagram of a computer program product for identifying dead cache blocks in a cache memory, in accordance with the present disclosure. As shown in FIG. 10, a computer program product 1005 includes a signal bearing medium 1010 that may also include computer executable instructions 1015. Computer executable instructions 1015 may be arranged to detect a cache burst of a cache block in cache memory. The computer executable instructions 1015 may further be arranged to identify a cache block as dead cache block based on a property of the cache burst.

Also depicted in FIG. 10, in some examples, computer program product 1005 may include one or more of a computer readable medium 1020, a recordable medium 1025 and a communications medium 1030. The dotted boxes around these elements may depict different types of mediums that may be included within, but not limited to, signal bearing medium 1010. These types of mediums may distribute programming instructions 1015 to be executed by computer devices including processors, logic and/or other facility for executing such instructions. Computer readable medium 1020 and recordable medium 1025 may include, but are not limited to, a flexible disk, a hard disk drive (HDD), a Compact Disc (CD), a Digital Video Disk (DVD), a digital tape, a computer memory, etc. Communication medium may include, but is not limited to, a digital and/or an analog communication medium (e.g., a fiber optic cable, a waveguide, a wired communication link, a wireless communication link, etc.).

Figure 11A:
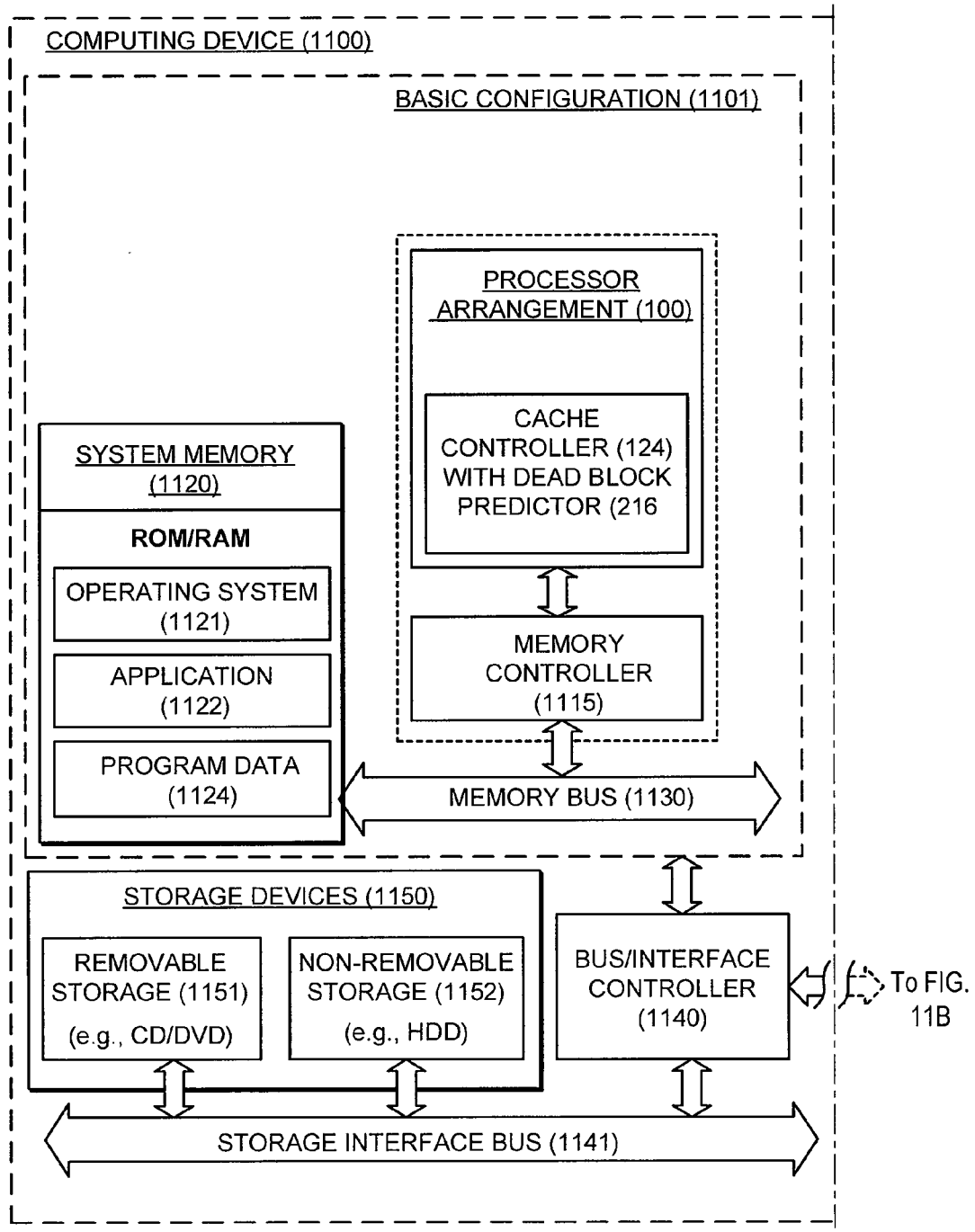
FIGS. 11A and 11B are a block diagram of an example of a computing device that is arranged for identifying dead cache blocks in a system with cache memory, in accordance with the present disclosure.
Figure 11B:
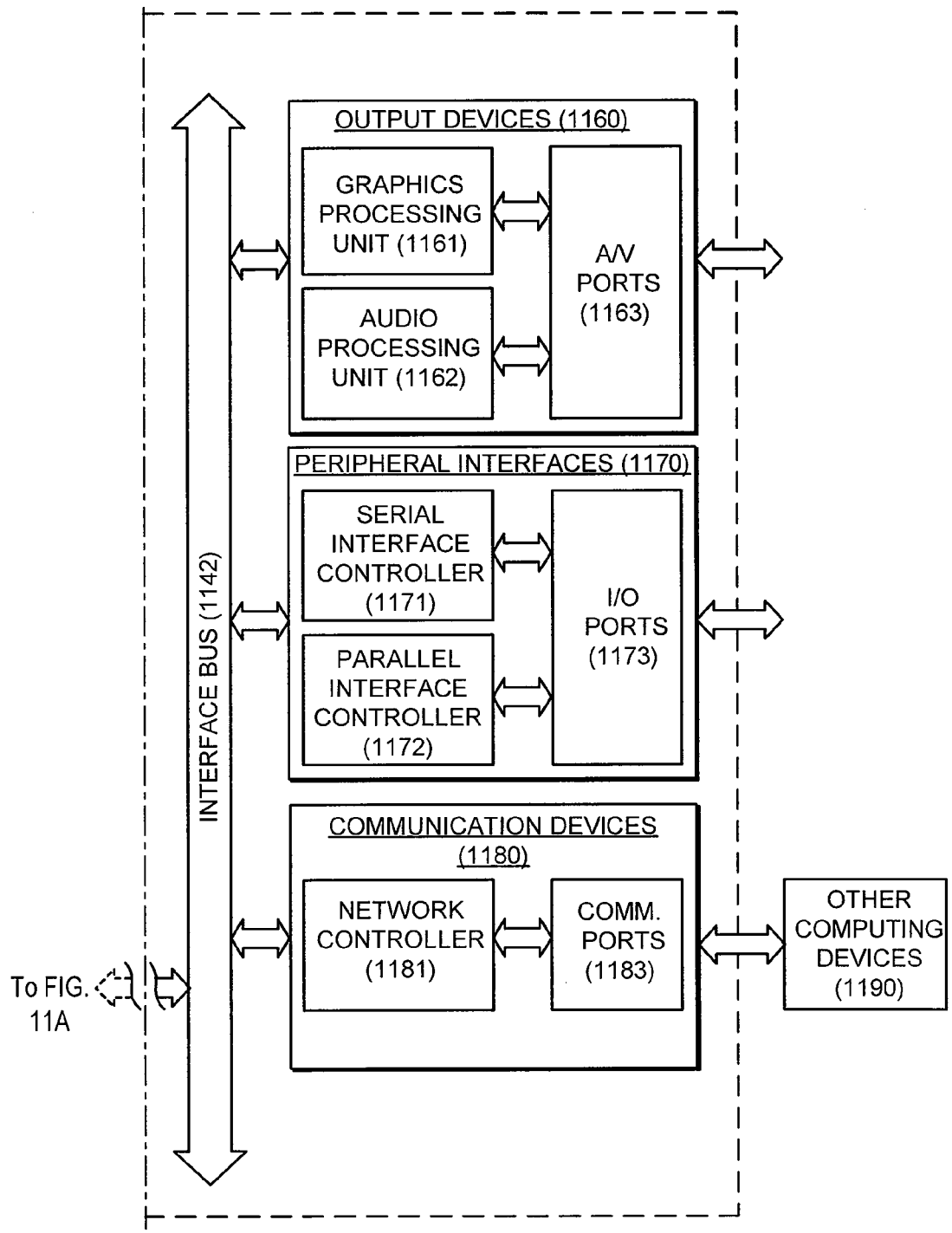

FIGS. 11A and 11B are a block diagram illustrating an example computing device 1100 that is arranged for identifying dead cache blocks in a system with cache memory, in accordance with the present disclosure. In a very basic configuration 1101, computing device 1100 typically includes one or more multinodal processor arrangement 100, such as described above in FIGS. 1 and 2, and system memory 1120. The multinodal processor arrangement 100 may include a cache controller 124 with a dead block predictor 216, that may also include a predictor table 218, that operate to perform dead block prediction as described above in connection with methods 400 (FIG. 4) and 500 (FIG. 5). A memory bus 1130 can be used for communicating between the multinodal processor arrangement 100 and the system memory 1120.

Depending on the desired configuration, the system memory 1120 can be of any type including but not limited to volatile memory (such as RAM), non-volatile memory (such as ROM, flash memory, etc.) or any combination thereof. System memory 1120 typically includes an operating system 1121, one or more applications 1122, and program data 1124. In some embodiments, application 1122 can be arranged to operate with program data 1124 on an operating system 1121. This described basic configuration is illustrated in FIGS. 11A and 11B by those components within dashed line 1101.

Computing device 1100 can have additional features or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include an interface bus 1142 for facilitating communication from various interface devices (e.g., output interfaces, peripheral interfaces, and communication interfaces) to the basic configuration 1101 via the bus/interface controller 1140. Example output devices 1160 include a graphics processing unit 1161 and an audio processing unit 1162, which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173. An example communication device 1180 includes a network controller 1181, which can be arranged to facilitate communications with one or more other computing devices 1190 over a network communication via one or more communication ports 1182.

The communication connection is one example of a communication medium. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

The foregoing describes various examples of cache memory systems. One example of a cache memory system may include a cache memory including a cache set having a plurality of storage locations for a first cache block, where the cache memory is adapted for access by a cache client. The cache memory system may further include a cache controller configured to identify a cache burst of the first cache block and to identify the first cache block as a dead cache block when a property of a cache burst of the first cache block is detected. The cache burst may comprise a first access of the first cache block by the cache client and any subsequent contiguous accesses of the first cache block following the first access by the cache client while the first cache block is in a most recently used position of the cache set.

In other examples, the property of the cache burst detected by the cache controller may be a number of cache bursts of the first cache block. Additionally, the cache controller may be further configured to mark the first cache block for eviction from the cache set when the number of cache bursts of the first cache block reaches a threshold number. In another example, the cache burst ending access may be the later of a last contiguous access of the first cache block by the cache client or the first access of the first cache block by the cache client. The cache burst ending access may have a program counter associated therewith, and the property of the cache burst detected by the cache controller may be the program counter associated with the cache burst ending access by the cache client.

In additional examples, a cache burst ending access may be the later of a last contiguous access of the first cache block by the cache client or the first access of the first cache block by the cache client. The cache burst ending access may have a program counter associated therewith, and the property of the cache burst detected by the cache controller may be a first series of program counters associated with one or more cache burst ending accesses by the cache client. In addition, the cache memory system may further include a predictor table having a plurality of entries associated with a corresponding plurality of addresses. The cache controller may be further configured to derive an address of the predictor table based on an XOR operation of the series of program counters and may mark the first cache block for eviction from the cache set based on the entry in the predictor table associated with the derived address. In further examples, the cache memory system may further include a memory that is separate from the cache memory, where the memory may include storage for a second memory block. On an access to the second memory block, the cache controller may be further configured to identify the second memory block as a dead cache block based on a property of a cache burst of the second memory block detected by the cache controller, and the cache controller may be further configured to load the second memory block into the cache set if the second memory block is not identified as a dead cache block.

In other examples, the property of the cache burst of the second memory block detected by the cache controller may be a number of cache bursts of the second memory block. In addition, the cache burst ending access may be the later of a last contiguous access of the second memory block by the cache client or the first access of the second memory block by the cache client. The cache burst ending access may have a program counter associated therewith. The property of the cache burst detected by the cache controller may be the program counter associated with the cache burst ending access by the cache client. Furthermore, the cache controller may be further configured to replace the first cache block with the second memory block when the first cache block is identified as a dead cache block and the second memory block is not identified as a dead cache block.

The foregoing also describes various examples of methods for operating a cache controller for a cache memory. One such method may include detecting a cache burst of a first cache block in a cache set in the cache memory, where the cache burst may comprise a first access of the first cache block by a cache client and any subsequent contiguous accesses of the first cache block following the first access by the cache client while the first cache block is in a most recently used position of the cache set. The method may further include identifying that the first cache block is a dead cache block based on a property of the cache burst of the first cache block.

In other examples, the detecting operation may further include detecting when the first cache block moves from the most recently used position of the cache set to a non-most recently used position of the cache set. Additionally, the method may further include marking the first cache block for eviction from the cache set when the first cache block is identified as the dead cache block, and subsequently loading a second memory block from a memory separate from the cache memory into the cache set to replace the first cache block in the cache set. In addition, the method may also include identifying whether a second memory block from a memory separate from the cache memory is predicted to be a further dead cache block based on a property of a cache burst of the second memory block, where the second memory block may be loaded into the cache set when the cache controller determines that the second memory block is not identified as the further dead cache block. In addition, the property of the cache burst may be a number of cache bursts of the first cache block.

Furthermore, the method may also include marking the first cache block for eviction from the cache memory when the number of cache bursts of the first cache block reaches a threshold number. In another example, a cache burst ending access may be the later of a last contiguous access of the first cache block by the cache client or the first access of the first cache block by the cache client and may have a program counter associated therewith. The identifying operation may further include determining whether the first cache block is a dead block based on the program counter associated with the cache burst ending access by the cache client. In some examples, the cache burst ending access may be the later of a last contiguous access of the first cache block by the cache client or the first access of the first cache block by the cache client and may have a program counter associated therewith, and the identifying operation may further include determining whether the first cache block is a dead cache block based on a first series of program counters associated with one or more cache burst ending accesses by the cache client. The method may further include deriving an address in a predictor table having a plurality of entries associated with a corresponding plurality of addresses based on an XOR operation of the series of program counters. The method may include marking the first cache block for eviction from the cache set based on the entry in the predictor table associated with the derived address.

The foregoing also includes computer accessible mediums having stored thereon computer executable instructions for performing a procedure for a cache controller to identify dead cache blocks in a cache memory. In some examples, when the procedure is executed by a processor, the processor may be configured to perform a procedure including detecting a cache burst of a first cache block in a cache set in the cache memory, where the cache burst may include a first access of the first cache block by a cache client and any subsequent contiguous accesses of the first cache block following the first access by the cache client while the first cache block is in a most recently used position of the cache set. The procedure may further include identifying that the first cache block may be a dead cache block based on a property of the cache burst of the first cache block. In another example, the detecting operation may further include detecting when the first cache block moves from the most recently used position of the cache set to a non-most recently used position of the cache set.

The present disclosure is not to be limited in terms of the particular examples described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member.

Directional terms such as horizontal or vertical are used for convenience to denote the layout of an array, but do not necessarily imply that the horizontal or vertical directions are ultimately oriented horizontally or vertically with respect to a horizon of a physical device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A cache memory system comprising:
   a cache memory including a cache set having a plurality of storage locations for a first cache block, wherein the cache memory is adapted for access by a cache client; and
   a cache controller configured to identify a cache burst of the first cache block and to identify the first cache block as a dead cache block when a property of the cache burst of the first cache block is detected,
   wherein the cache burst comprises a first access of the first cache block by the cache client and any subsequent accesses of the first cache block that are contiguous in time following the first access by the cache client while the first cache block is in a most recently used position of the cache set.

2. The cache memory system of claim 1, wherein the property of the cache burst detected by the cache controller is a number of cache bursts of the first cache block.

3. The cache memory system of claim 2, wherein the cache controller is further configured to mark the first cache block for eviction from the cache set when the number of cache bursts of the first cache block reaches a threshold number.

4. The cache memory system of claim 1, wherein a cache burst ending access is the later of a last contiguous access of the first cache block by the cache client or the first access of the first cache block by the cache client, the cache burst ending access having a program counter associated therewith, and the property of the cache burst detected by the cache controller is the program counter associated with the cache burst ending access by the cache client.

5. The cache memory system of claim 1, wherein a cache burst ending access is the later of a last contiguous access of the first cache block by the cache client or the first access of the first cache block by the cache client, the cache burst ending access having a program counter associated therewith, and the property of the cache burst detected by the cache controller is a first series of program counters associated with one or more cache burst ending accesses by the cache client.

6. The cache memory system of claim 5, further comprising:
   a predictor table having a plurality of entries associated with a corresponding plurality of addresses;
   wherein the cache controller is further configured to derive an address of the predictor table based on an XOR operation of the series of program counters and mark the first cache block for eviction from the cache set based on an entry in the predictor table associated with the derived address.

7. The cache memory system of claim 1, further comprising a memory that is separate from the cache memory, wherein the memory includes storage for a second memory block, wherein on an access to the second memory block, the cache controller is further configured to identify the second memory block as a dead cache block based on a property of a cache burst of the second memory block detected by the cache controller, and wherein the cache controller is further configured to load the second memory block into the cache set in response to the second memory block not being identified as a dead cache block.

8. The cache memory system of claim 7, wherein the property of the cache burst of the second memory block detected by the cache controller is a number of cache bursts of the second memory block.

9. The cache memory system of claim 7, wherein a cache burst ending access is the later of a last contiguous access of the second memory block by the cache client or the first access of the second memory block by the cache client, the cache burst ending access having a program counter associated therewith, and the property of the cache burst detected by the cache controller is the program counter associated with the cache burst ending access by the cache client.

10. The cache memory system of claim 7, wherein the cache controller is further configured to replace the first cache block with the second memory block when the first cache block is identified as a dead cache block and the second memory block is not identified as a dead cache block.

11. A method for operating a cache controller for a cache memory, comprising:
    detecting a cache burst of a first cache block in a cache set in the cache memory, wherein the cache burst comprises a first access of the first cache block by a cache client and subsequent accesses of the first cache block that are contiguous in time following the first access by the cache client while the first cache block is in a most recently used position of the cache set; and
    identifying that the first cache block is a dead cache block based on a property of the cache burst of the first cache block.

12. The method of claim 11, wherein the detecting operation further comprises detecting when the first cache block moves from the most recently used position of the cache set to a non-most recently used position of the cache set.

13. The method of claim 12, further comprising marking the first cache block for eviction from the cache set when the first cache block is identified as the dead cache block, and subsequently loading a second memory block from a memory separate from the cache memory into the cache set to replace the first cache block in the cache set.

14. The method of claim 12, further comprising identifying whether a second memory block from a memory separate from the cache memory is predicted to be a further dead cache block based on a property of a cache burst of the second memory block, wherein the second memory block is loaded into the cache set when the cache controller determines that the second memory block is not identified as the further dead cache block.

15. The method of claim 12, wherein a cache burst ending access is the later of a last contiguous access of the first cache block by the cache client or the first access of the first cache block by the cache client, the cache burst ending access having a program counter associated therewith, and the identifying operation further comprises determining whether the first cache block is a dead block based on the program counter associated with the cache burst ending access by the cache client.

16. The method of claim 11, wherein the property of the cache burst is a number of cache bursts of the first cache block.

17. The method of claim 16, further comprising marking the first cache block for eviction from the cache memory when the number of cache bursts of the first cache block reaches a threshold number.

18. The method of claim 11, wherein a cache burst ending access is the later of a last contiguous access of the first cache block by the cache client or the first access of the first cache block by the cache client, the cache burst ending access having a program counter associated therewith, and the identifying operation further comprises determining whether the first cache block is a dead cache block based on a first series of program counters associated with one or more cache burst ending accesses by the cache client, the method further comprising:

deriving an address in a predictor table having a plurality of entries associated with a corresponding plurality of addresses based on an XOR operation of the series of program counters and marking the first cache block for eviction from the cache set based on an entry in the predictor table associated with the derived address.

19. A non-transitory computer accessible medium having stored thereon computer executable instructions for performing a procedure for a cache controller to identify dead cache blocks in a cache memory, wherein, when the procedure is executed by a processor, the processor is configured to perform or causes to be performed the procedure comprising:

detecting a cache burst of a first cache block in a cache set in the cache memory, wherein the cache burst comprises a first access of the first cache block by a cache client and subsequent accesses of the first cache block that are contiguous in time following the first access by the cache client while the first cache block is in a most recently used position of the cache set; and identifying that the first cache block is a dead cache block based on a property of the cache burst of the first cache block.

20. The computer accessible medium of claim 19, wherein the detecting operation further comprises detecting when the first cache block moves from the most recently used position of the cache set to a non-most recently used position of the cache set.

* * * * *